United States Patent
Kinugasa et al.

(10) Patent No.: US 12,188,583 B2
(45) Date of Patent: Jan. 7, 2025

(54) CHARGED PARTICLE ACCELERATOR AND METHOD FOR BUILDING CHARGED PARTICLE ACCELERATOR

(71) Applicants: TOSHIBA ENERGY SYSTEMS & SOLUTIONS CORPORATION, Kawasaki (JP); TOSHIBA PLANT SYSTEMS & SERVICES CORPORATION, Yokohama (JP)

(72) Inventors: Kunihiko Kinugasa, Yokohama (JP); Hiromasa Itou, Gyoda (JP); Yujiro Tajima, Yokohama (JP); Yoshiharu Kanai, Yokohama (JP)

(73) Assignees: TOSHIBA ENERGY SYSTEMS & SOLUTIONS CORPORATION, Kawasaki (JP); TOSHIBA PLANT SYSTEMS & SERVICES CORPORATION, Yokohama (JP)

( * ) Notice: Subject to any disclaimer, the term of this patent is extended or adjusted under 35 U.S.C. 154(b) by 257 days.

(21) Appl. No.: 17/470,345

(22) Filed: Sep. 9, 2021

(65) Prior Publication Data
US 2021/0404580 A1    Dec. 30, 2021

Related U.S. Application Data

(63) Continuation of application No. PCT/JP2020/016247, filed on Apr. 13, 2020.

(30) Foreign Application Priority Data

Apr. 15, 2019    (JP) ................. 2019-077344

(51) Int. Cl.
| | |
|---|---|
| *F16L 19/065* | (2006.01) |
| *F16L 19/07* | (2006.01) |
| *H05H 7/00* | (2006.01) |

(52) U.S. Cl.
CPC ............. *F16L 19/065* (2013.01); *F16L 19/07* (2013.01); *H05H 7/00* (2013.01)

(58) Field of Classification Search
CPC .......... F16L 19/06; F16L 19/065; F16L 19/07
See application file for complete search history.

(56) References Cited

U.S. PATENT DOCUMENTS 2,405,822 A * 8/1946 Franck ................ F16L 19/065
2,523,135 A * 9/1950 Mercier ............... F16L 19/065
(Continued)

FOREIGN PATENT DOCUMENTS

| CN | 106163075 A | 11/2016 |
|---|---|---|
| JP | 5-57380 A | 3/1993 |

(Continued)

OTHER PUBLICATIONS

International Search Report issued Jun. 16, 2020 in PCT/JP2020/016247, filed on Apr. 13, 2020, 2 pages.

*Primary Examiner* — Zachary T Dragicevich
(74) *Attorney, Agent, or Firm* — Oblon, McClelland, Maier & Neustadt, L.L.P.

(57) ABSTRACT

A charged particle accelerator and a method for building the same includes in a vacuum-duct joint-portion, a male screw 21 engraved on an outer peripheral surface of a joint, a contact surface 25 to be brought into contact with an annular seal 12 is formed at the end of the inner peripheral surface 22 of the joint, a pressing surface 26 for pressing the annular seal 12 toward the contact surface 25 of the joint 11A is formed on the ring, an abutting surface 28 that abuts on the ring 15 is formed on the nut, and a female screw 27 to be screwed to the male screw 21 of the joint 11A is engraved on the inner peripheral surface of the nut 16.

4 Claims, 7 Drawing Sheets

(56) References Cited

U.S. PATENT DOCUMENTS

| | | | | |
|---|---|---|---|---|
| 3,265,414 | A | * | 8/1966 | Reid ...................... F16L 19/065 |
| 3,275,350 | A | * | 9/1966 | Kody ..................... F16L 19/065 |
| 2013/0294557 | A1 | | 11/2013 | Perkins |
| 2021/0018120 | A1 | * | 1/2021 | Bottura ................. F16L 19/065 |

FOREIGN PATENT DOCUMENTS

| | | |
|---|---|---|
| JP | 05-217694 A | 8/1993 |
| JP | 8-50999 A | 2/1996 |
| JP | 8-124698 A | 5/1996 |
| JP | 8-326968 A | 12/1996 |
| JP | 09-199298 A | 7/1997 |
| JP | 2002-130563 A | 5/2002 |
| KR | 10-318461 A | 12/1998 |
| KR | 10-1621758 B1 | 5/2016 |
| KR | 10-2018-0060645 A | 6/2018 |

\* cited by examiner

CHARGED PARTICLE ACCELERATOR AND METHOD FOR BUILDING CHARGED PARTICLE ACCELERATOR

CROSS-REFERENCE TO RELATED APPLICATIONS

This application is a Continuation Application of No. PCT/JP2020/016247, filed on Apr. 13, 2020, and the PCT application is based upon and claims the benefit of priority from Japanese Patent Application No. 2019-077344, filed on Apr. 15, 2019, the entire contents of which are incorporated herein by reference.

TECHNICAL FIELD

Embodiments of the present invention relate to a charged particle accelerator and a method for building a charged particle accelerator.

BACKGROUND

In an accelerator, a trajectory of charged particles is formed by a vacuum duct that is configured by interconnecting both ends of a plurality of duct components with the use of joint members. Along this vacuum duct, a plurality of devices such as a bending electromagnet, a quadrupole electromagnet, and a screen monitor are installed for controlling the trajectory of charged particles that move in the internal space of this vacuum duct. The joint members constituting the vacuum duct of the conventional accelerator are flange bodies that are welded to both ends of the duct components.

PRIOR ART DOCUMENT

Patent Document

[Patent Document 1] JP H08-124698 A

SUMMARY

Problems to be Solved by Invention

When the duct components for incorporating various devices are interconnected in conventional technology, it is unavoidable to go through the process of disassembling equipment such as an electromagnet at a factory or on site, installing duct components having flanges, and shipping after reassembly. Additionally or alternatively, in conventional technology, it is unavoidable to go through the process of installing equipment such as an electromagnet on site, inserting duct components, each of which has a flange only at one end, into the equipment, and then welding a flange body to the opposite end. For this reason, a lot of work is required for assembling the vacuum duct of the accelerator on site and in the factory.

In view of the above-described circumstances, an object of embodiments of the present invention is to provide a charged particle accelerator and a method for building it, each of which can simplify the assembly work.

DETAILED DESCRIPTION

First Embodiment

Figure 1:
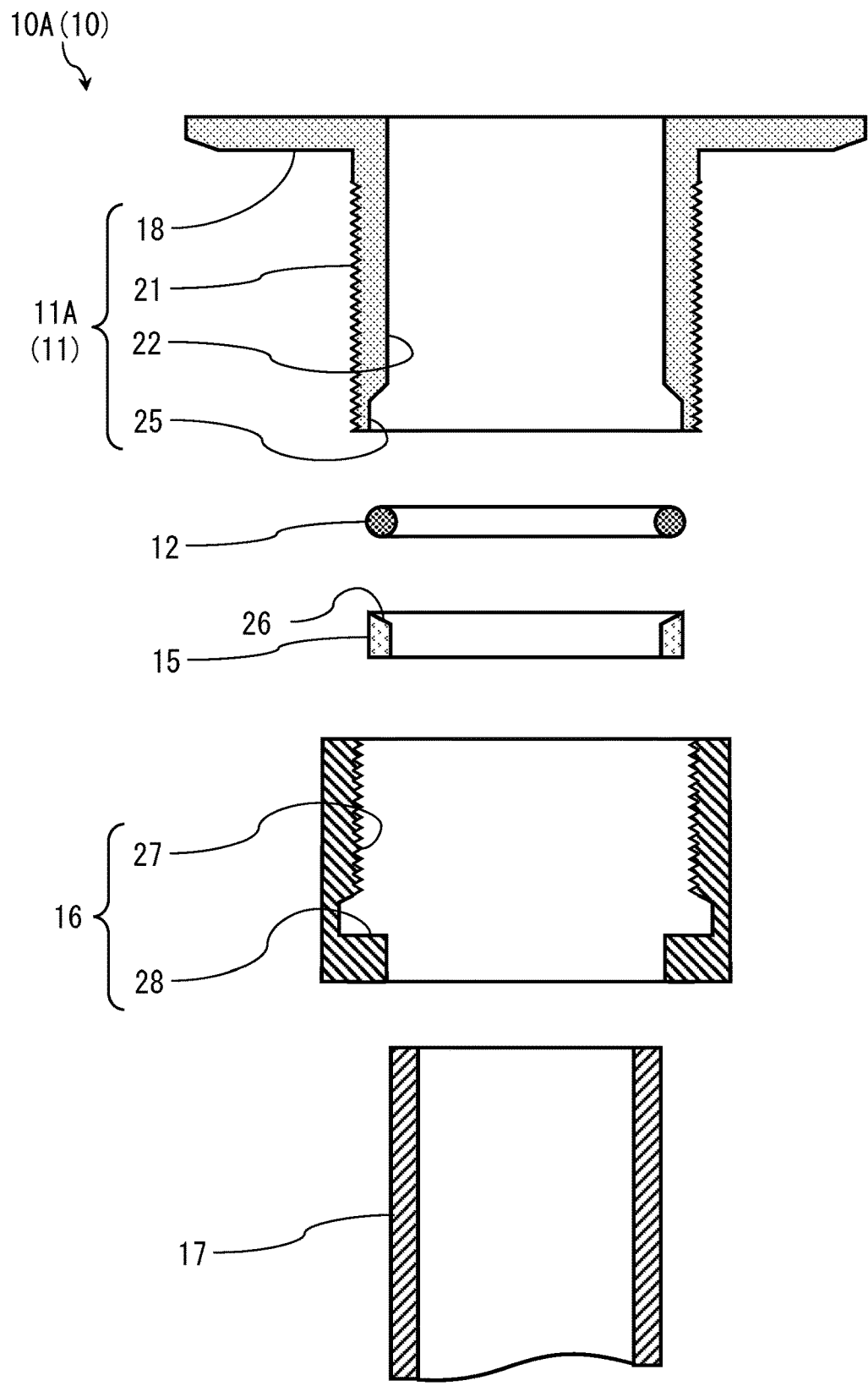
FIG. 1 is an exploded view of a part of the charged particle accelerator according to the first embodiment of the present invention.

Hereinafter, embodiments of the present invention will be described by referring to the accompanying drawings. FIG. 1 is an exploded view of a part of the charged particle accelerator according to the first embodiment of the present invention. In a vacuum-duct joint-portion 10A (10) which is a part of the charged particle accelerator, the charged particle accelerator includes: a joint (i.e., joint member) 11A; an annular seal (i.e., annular seal material) 12, a ring (i.e., ring member) 15, and a nut (i.e., nut member) 16, each of these members 11A, 12, 15, 16 is inserted through a duct (or duct component) 17 through which charged particles pass.

In the joint 11A, a male screw 21 is engraved on its outer peripheral surface, and a contact surface 25 to be brought into contact with the annular seal 12 is formed at the end of its inner peripheral surface 22. A flange plate 18 is formed on the tip side of the joint 11A in the first embodiment. On the ring 15, a pressing surface 26 for pressing the annular seal 12 toward the contact surface 25 of the joint 11A is formed. On the nut 16, an abutting surface 28 that abuts on the ring 15 is formed. A female screw 27 to be screwed to the male screw 21 of the joint 11A is engraved on the inner peripheral surface of the nut 16.

Figure 2:
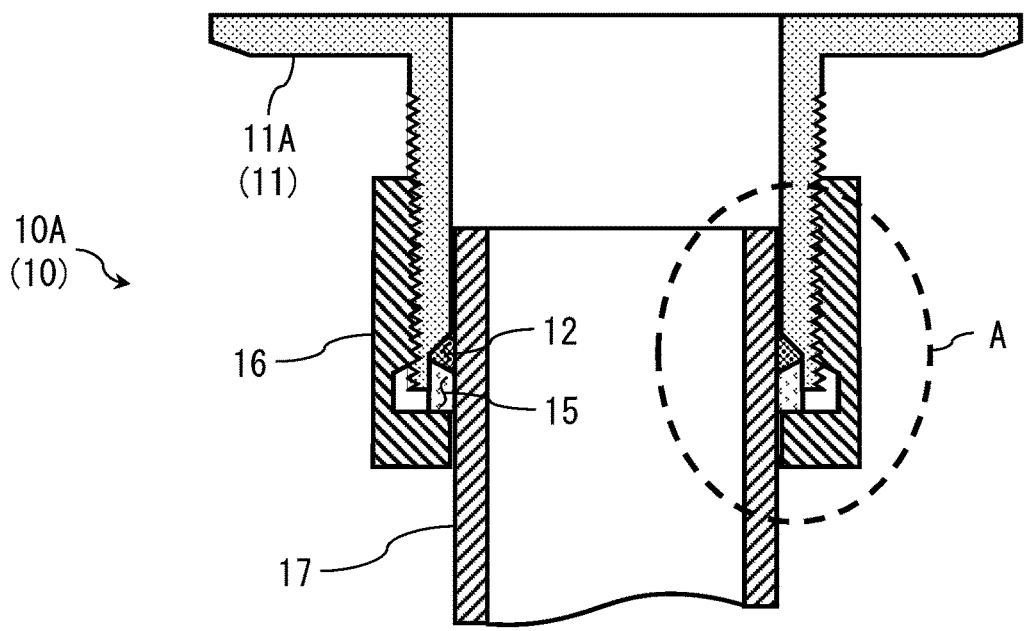
FIG. 2 is an assembly diagram of a part of the charged particle accelerator according to the first embodiment.

FIG. 2 is an assembly diagram of a part of the charged particle accelerator according to the first embodiment. Between the flange plates 18 (FIG. 1) of two joints 11A facing each other, the vacuum-duct joint-portions 10A provided at the respective ends of the ducts 17 are made to abut each other and fastened with screws or the like. On the abutting surface of the flange plate 18, sealing materials (not shown) such as gaskets and O-rings for ensuring internal sealability are disposed. A plurality of ducts 17 are connected in this manner, and thereby, a vacuum duct configured to serve as a trajectory of moving charged particles is formed.

Figure 3:
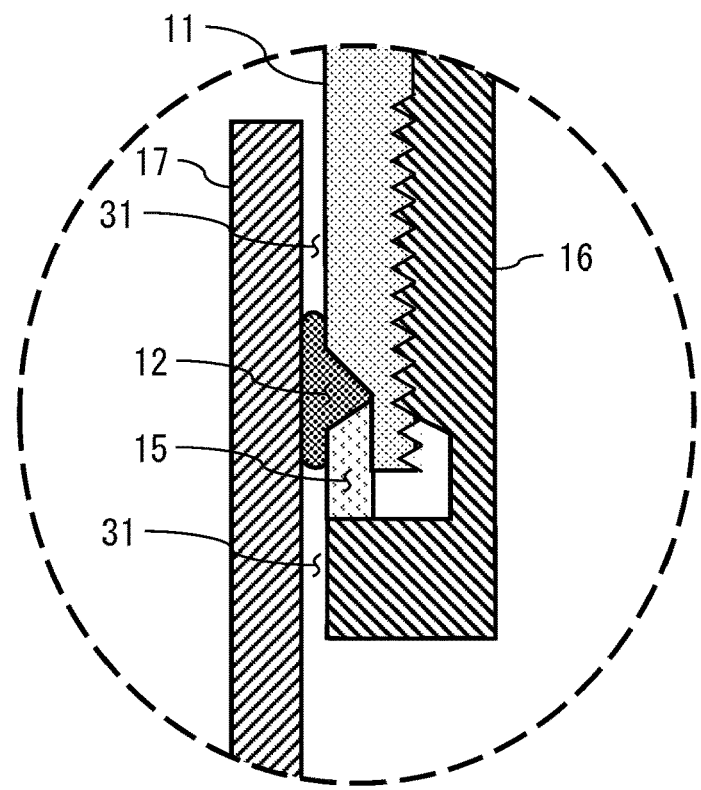
FIG. 3 is an enlarged cross-sectional view of the part A in FIG. 2 showing an enlarged view of a vacuum-duct joint-portion.

FIG. 3 is an enlarged cross-sectional view of the broken-line part A in FIG. 2 showing the vacuum-duct joint-portion 10. A clearance 31 is formed between the duct 17 and the joint 11. Another clearance 31 is also formed between the duct 17 and the nut 16. These clearances 31 allow the duct 17 to tilt with respect to the joint 11.

The inner diameter of the joint 11 has a dimensional margin and is larger than the outer diameter of the duct 17 to be inserted through. As to the contact surface 25 (FIG. 1)

formed at the end of the joint 11, the inner peripheral surface 22 is enlarged to the extent that the outer circumference of the ring 15 is engaged, and the surface with which the annular seal 12 is brought into close contact is formed in a tapered shape. The inner diameter of the ring 15 has a dimensional margin so as to be larger than the outer diameter of the duct 17 to be inserted through, and the end face with which the annular seal 12 is brought into close contact is formed in a tapered shape. The ring 15 has a smoothly formed end surface that abuts on the abutting surface 28 (FIG. 1) of the nut 16, and this end face is smooth enough to prevent the ring 15 from rotating in conjunction with rotation of the nut 16.

The annular seal 12 is formed by using a material such as an O-ring that elastically deforms under pressing force and adheres to the contact surface so as to exhibit airtightness. When the joint 11 is screwed into the nut 16, the annular seal 12 receives pressing force from the end of joint 11, the end face of the ring 15, and the outer peripheral surface of the duct 17. The elastically deformed annular seal 12 seals the intrusion route of the outside air along the outer peripheral surface of the duct 17 so as to maintain the degree of vacuum inside the duct 17. Even if the duct 17 is tilted with respect to the joint 11 within the range of the clearances 31, the elastic deformation of the annular seal 12 follows such that the airtightness is not impaired. Although positional deviation during construction is generally absorbed by installing bellows, in each embodiment, positional deviation can be absorbed without bellows.

Figure 4A:
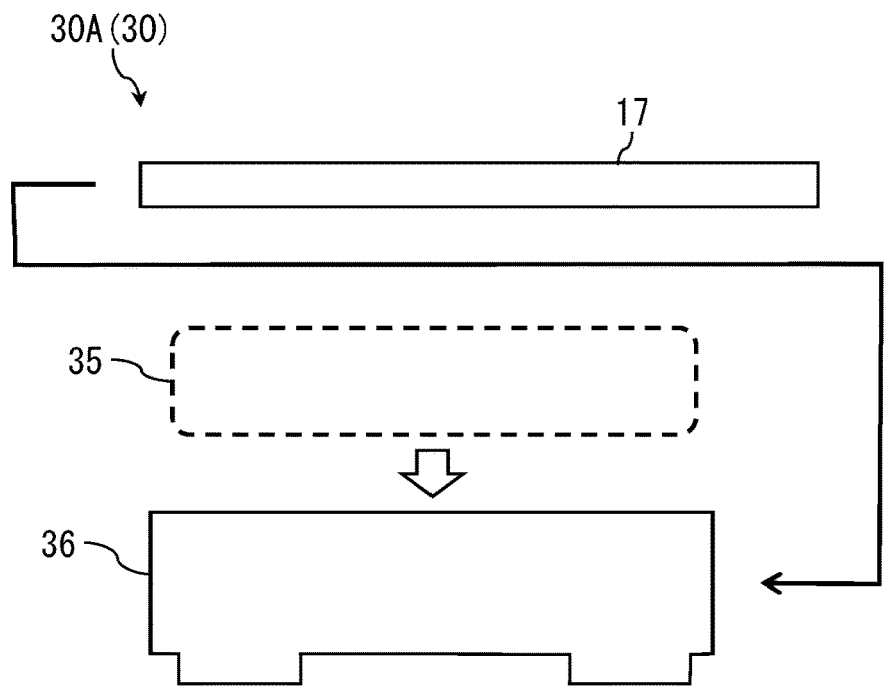
FIG. 4A to FIG. 4C are process diagrams illustrating a method for building the charged particle accelerator according to the first embodiment.
Figure 4B:
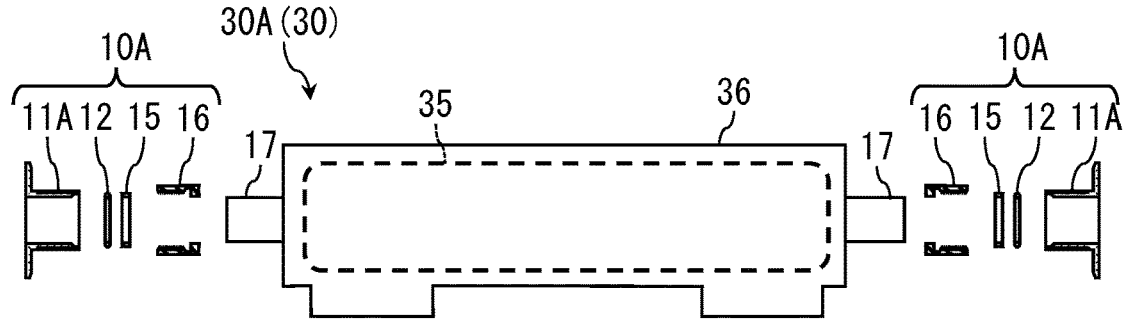
Figure 4C:
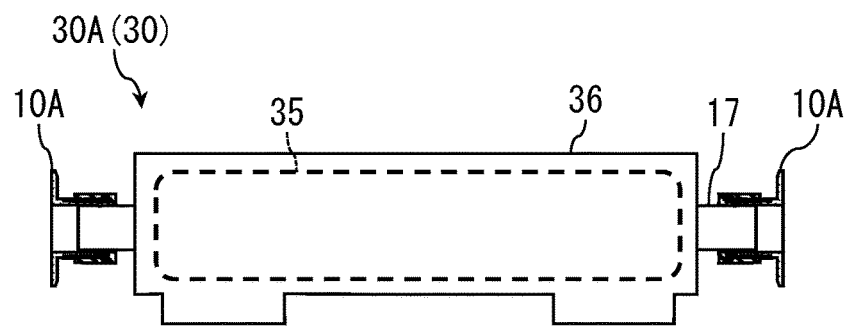

FIG. 4A to FIG. 4C are process diagrams illustrating a method for building the charged particle accelerator 30A according to the first embodiment. As shown in FIG. 4A to FIG. 4C, the charged particle accelerator 30A includes: a device 35 that interacts with charged particles passing through the duct 17; and a supporter (support member) 36 that supports the device 35 with respect to a floor surface (not shown). Although the device 35 interacting with the passing charged particles is exemplified by a bending electromagnet, a quadrupole electromagnet, and a screen monitor, the device 35 is not limited to those.

In the construction method of the charged particle accelerator 30A according to the first embodiment, as shown in FIG. 4A, the duct 17 is inserted through the device 35. Further, as shown in FIG. 4B, the nut 16, the ring 15, the annular seal 12, and the joint 11A are inserted in this order from the tip of the duct 17. Thereafter, the male screw 21 (FIG. 1) of the joint 11A and the female screw 27 (FIG. 1) of the nut 16 are screwed together. As a result, the assembly of the vacuum-duct joint-portion 10A is completed as shown in FIG. 4C.

Figure 5A:
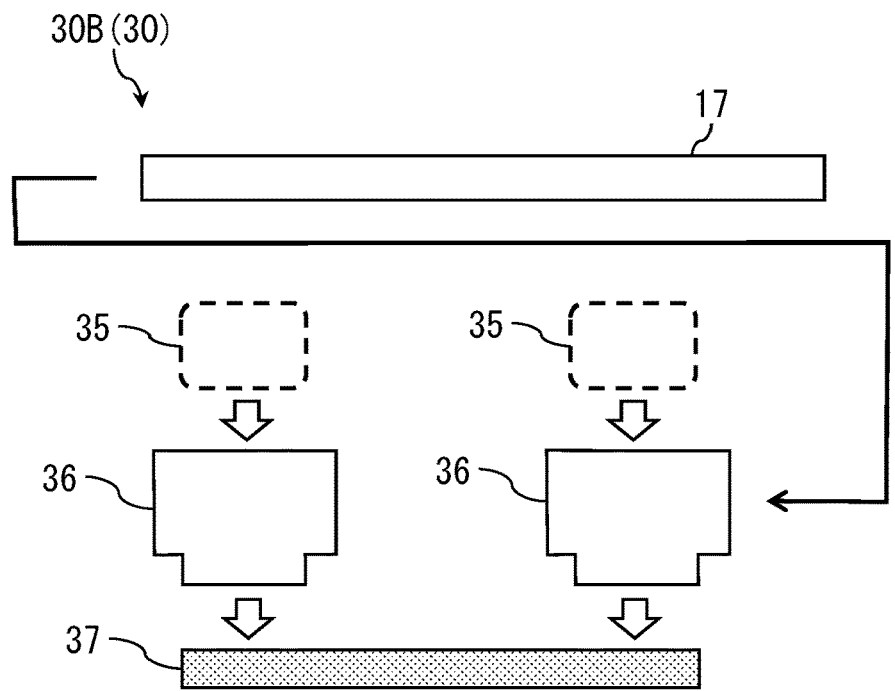
FIG. 5A to FIG. 5C are process diagrams illustrating a method for building another aspect of the charged particle accelerator according to the first embodiment.
Figure 5B:
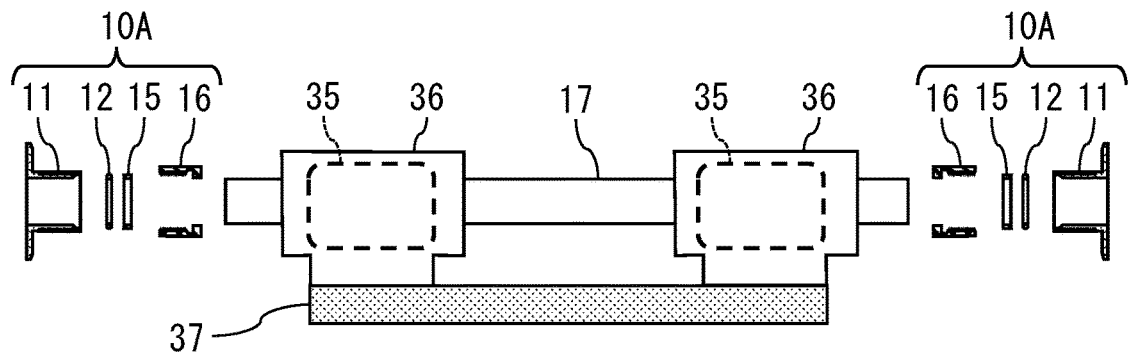
Figure 5C:
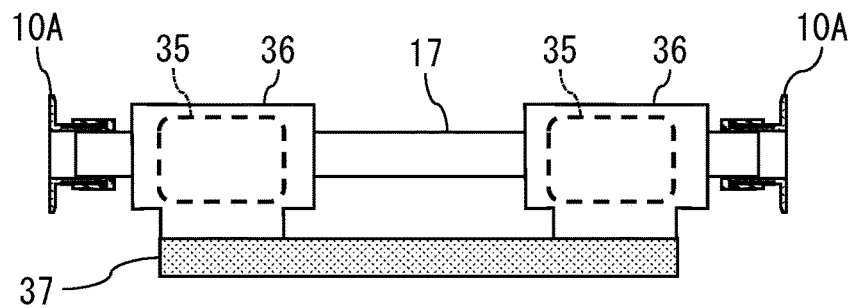

FIG. 5A to FIG. 5C are process diagrams illustrating a method for building the charged particle accelerator 30B which is another aspect of the first embodiment. In some cases, the duct 17 is inserted through a plurality of devices 35. The construction method of the charged particle accelerator 30B conforms to the construction method of the charged particle accelerator 30A described above, and its description is omitted.

Second Embodiment

Next, the second embodiment of the present invention will be described by referring to FIG. 6 to FIG. 8C. In FIG. 6 to FIG. 8C, components having the same configuration or function as those in FIG. 1 to FIG. 5C are denoted by the same reference signs, and duplicate description is omitted.

Figure 6:
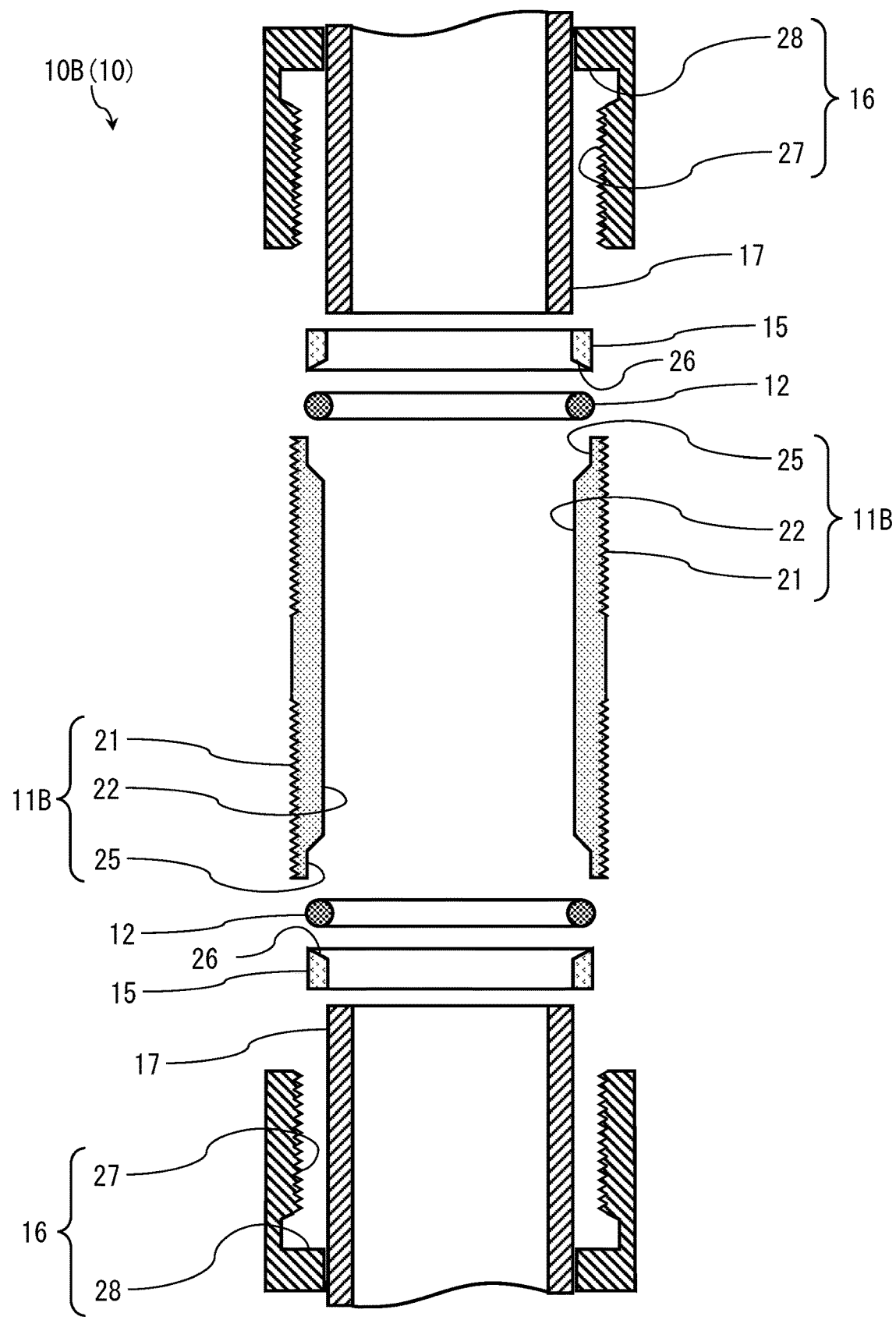
FIG. 6 is an exploded view of a part of the charged particle accelerator according to the second embodiment of the present invention.
Figure 7:
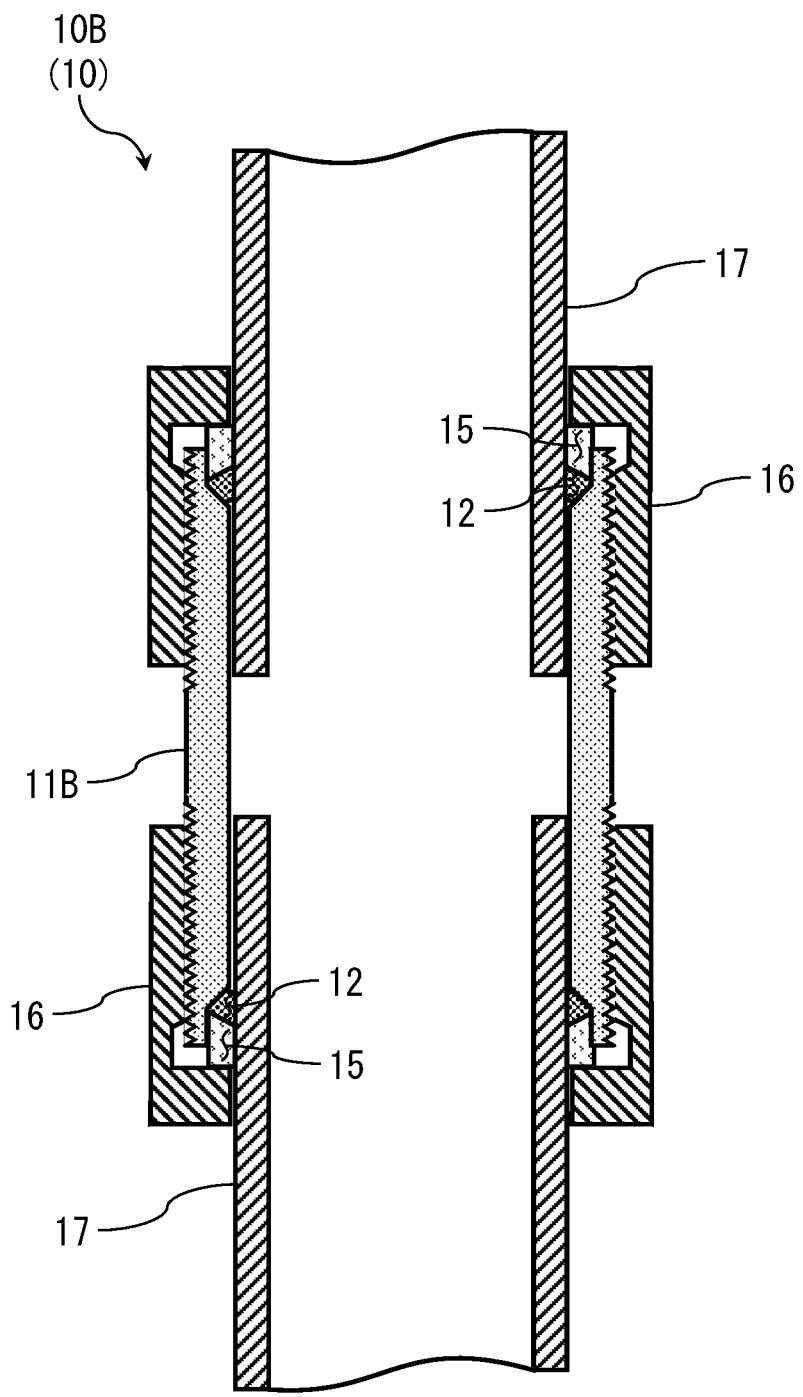
FIG. 7 is an assembly diagram of a part of the charged particle accelerator according to the second embodiment.

FIG. 6 is an exploded view of a part of the charged particle accelerator according to the second embodiment of the present invention. FIG. 7 is an assembly diagram of a part of the charged particle accelerator according to the second embodiment.

In the vacuum-duct joint-portion 10B (10) that is a part of the charged particle accelerator, the charged particle accelerator includes: a joint 11B; the annular seal 12; the ring 15; and the nut 16. These components 11B, 12, 15, and 16 are inserted through the duct 17 through which the charged particles pass.

In the joint 11B, the male screw 21 is engraved on its outer peripheral surface, and the contact surface 25 to be in contact with the annular seal 12 is formed at the end of its inner peripheral surface 22. In the joint 11B of the second embodiment, the contact surface 25 to be in contact with the annular seal 12 is formed at both ends, and two nuts 16 are screwed to both ends of the male screw 21 engraved on the outer peripheral surface. On the ring 15, a pressing surface 26 for pressing the annular seal 12 toward the contact surface 25 of the joint 11B is formed. On each nut 16, an abutting surface 28 that abuts on the ring 15 is formed. The female screw 27 to be screwed to the male screw 21 of the joint 11 is engraved on the inner peripheral surface of each nut 16.

Figure 8A:
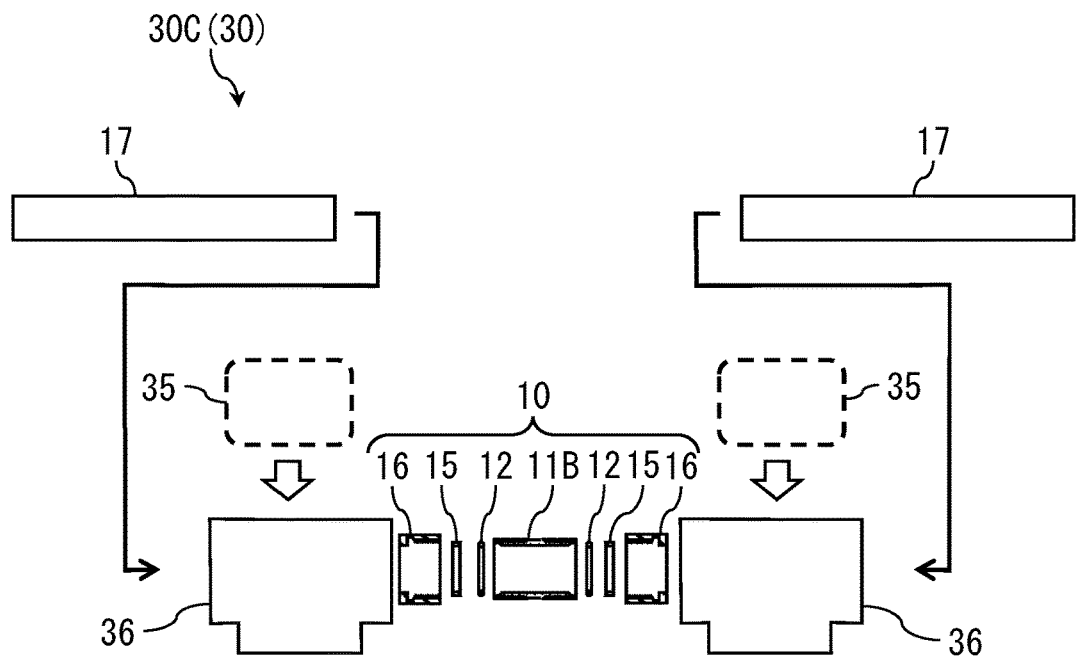
FIG. 8A to FIG. 8C are process diagrams illustrating a method for building the charged particle accelerator according to the second embodiment.
Figure 8B:
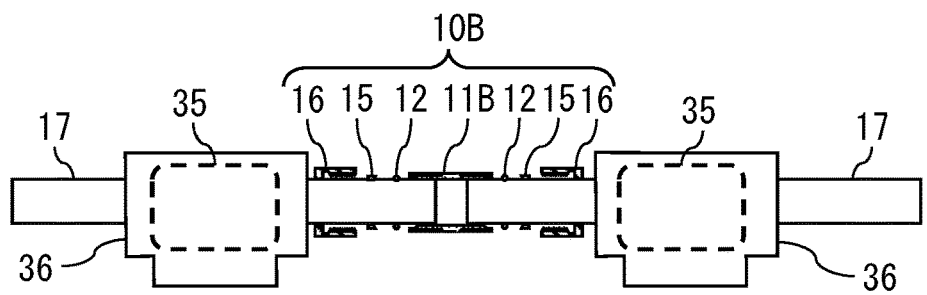
Figure 8C:
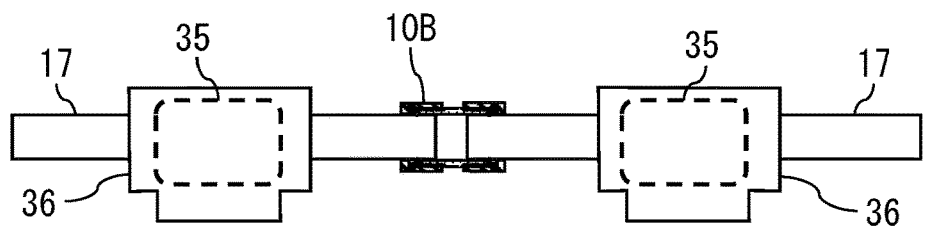

FIG. 8A to FIG. 8C are process diagrams illustrating a method for building the charged particle accelerator 30C according to the second embodiment. As shown in FIG. 8A to FIG. 8C, the charged particle accelerator 30C includes: devices 35 that interact with charged particles passing through the ducts 17; and the supporters 36 that support the devices 35 with respect to the floor surface (not shown).

In the construction method of the charged particle accelerator 30C according to the second embodiment, as shown in FIG. 8A, each duct 17 is inserted through the device 35. Thereafter, as shown in FIG. 8B, the nut 16, the ring 15, the annular seal 12, and the joint 11B are inserted in this order from the tip of each duct 17. Respective two ducts 17 facing each other are inserted into both ends of the joint 11B. Further, the male screw 21 (FIG. 6) of the joint 11B and the female screw 27 (FIG. 6) of each nut 16 are screwed together. As a result, the assembly of the vacuum-duct joint-portion 10B is completed as shown in FIG. 7 and FIG. 8C.

According to the method for building the charged particle accelerator 30 of each embodiment described above, neither disassembly of the device 35 such as an electromagnet nor welding work of the flange is necessary when the duct 17 is inserted into the device 35. Further, at the construction site, after installing the device 35, the vacuum duct can be installed and the degree of freedom of construction can be increased.

According to the charged particle accelerator of at least one embodiment described above, its assembly work can be simplified by configuring the tip of the duct component with a joint member, an annular seal material, a ring member, and a nut member.

While certain embodiments have been described, these embodiments have been presented by way of example only, and are not intended to limit the scope of the inventions. These embodiments may be embodied in a variety of other forms, and various omissions, substitutions, and changes may be made without departing from the spirit of the inventions. These embodiments and their modifications are included in the accompanying claims and their equivalents as well as included in the scope and gist of the inventions.

The invention claimed is:

1. A charged particle accelerator comprising:
   a duct through which charged particles pass;
   a device configured to interact with charged particles that pass through the duct, the duct is configured to extend through the device;
   a support configured to support the device with respect to a floor surface;
   a joint configured to allow the duct to be inserted there through;
   an annular seal configured to contact an outer peripheral surface of the duct;
   a ring configured to allow the duct to be inserted there through; and
   at least one nut configured to allow the duct to be inserted there through, wherein:
   a male screw is engraved on an outer peripheral surface of the joint;
   a contact surface to be in contact with the annular seal is formed at an end of an inner peripheral surface of the joint, the contact surface enlarges the inner peripheral surface of the joint to the extent that an outer circumference of the ring is engaged therewith, and a surface with which the annular seal is brought into close contact is formed in a tapered shape;
   a pressing surface for pressing the annular seal toward the contact surface of the joint is formed on the ring and the pressing surface is formed in a tapered shape;
   an abutting surface that abuts on the ring is formed on the nut; and
   a female screw to be screwed to the male screw, the female screw is engraved on an inner peripheral surface of the nut,
   wherein a first clearance formed by the duct and the joint and a second clearance formed by the duct and the nut allow the duct to tilt with respect to the joint,
   wherein the device is one of a bending electromagnet, a quadrupole electromagnet, and a screen monitor, and
   wherein end faces of each of the joint and the ring are formed in the tapered shape, so that the annular seal is brought into abutting contact to form a V-shape.

2. The charged particle accelerator according to claim 1, wherein a flange plate is formed on a tip side of the joint.

3. The charged particle accelerator according to claim 1, wherein:
   contact surfaces that are brought into contact with the annular seal are formed at both ends of the joint; and
   the male screw is engraved on the outer peripheral surface at both a first end and a second end, the at least one nut includes a first nut and a second nut, the first nut and the second nut are respectively screwed to the first end and the second end.

4. A method for building the charged particle accelerator according to claim 1 comprising:
   inserting the duct through the device;
   inserting the nut, the ring, the annular seal, and the joint from a tip of the duct in an order of the nut, the ring, the annular seal, and the joint; and
   screwing the male screw of the joint and the female screw of the nut together.

* * * * *